United States Patent
Richaud et al.

(10) Patent No.: US 9,579,721 B2
(45) Date of Patent: Feb. 28, 2017

(54) DOUBLE ENTRY CHANNEL LADLE BOTTOM

(75) Inventors: Johan Richaud, Cheval Blanc (FR); William Chung, Brampton (CA)

(73) Assignee: VESUVIUS CRUCIBLE COMPANY, Wilmington, DE (US)

( * ) Notice: Subject to any disclaimer, the term of this patent is extended or adjusted under 35 U.S.C. 154(b) by 316 days.

(21) Appl. No.: 14/344,151

(22) PCT Filed: Jul. 25, 2012

(86) PCT No.: PCT/US2012/048068
§ 371 (c)(1),
(2), (4) Date: Mar. 11, 2014

(87) PCT Pub. No.: WO2013/043257
PCT Pub. Date: Mar. 28, 2013

(65) Prior Publication Data
US 2014/0339271 A1  Nov. 20, 2014

Related U.S. Application Data

(60) Provisional application No. 61/537,905, filed on Sep. 22, 2011.

(51) Int. Cl.
*B22D 41/08* (2006.01)
*B22D 43/00* (2006.01)

(52) U.S. Cl.
CPC ........... *B22D 41/08* (2013.01); *B22D 43/001* (2013.01)

(58) Field of Classification Search
USPC .................................................. 222/591–607
See application file for complete search history.

(56) References Cited

U.S. PATENT DOCUMENTS

| 4,746,102 A | 5/1988 | Gilles et al. |
|---|---|---|
| 5,173,198 A | 12/1992 | Blum |
| 5,196,051 A | 3/1993 | Heaslip et al. |
| 5,382,003 A | 1/1995 | Sankaranarayanan et al. |
| 5,879,616 A | 3/1999 | Erny |
| 2002/0093128 A1 | 7/2002 | Koffron et al. |
| 2005/0127582 A1 | 6/2005 | Richaud et al. |
| 2007/0029708 A1 | 2/2007 | Richaud et al. |
| 2009/0206528 A1 | 8/2009 | Barrett et al. |

FOREIGN PATENT DOCUMENTS

| JP | 1977042411 U | 3/1977 |
|---|---|---|
| JP | 2005532909 A | 11/2005 |
| JP | 2007314836 A | 12/2007 |
| WO | 03072285 A | 9/2003 |

*Primary Examiner* — Lois Zheng
(74) *Attorney, Agent, or Firm* — Thomas Clinton; Donald M. Satina

(57) ABSTRACT

A metallurgical ladle, and more particularly the bottom of the ladle or a ladle block in the bottom of the ladle, have an outlet through which the molten metal can drain. The ladle bottom contains an open-end channel bounded by at least one wall with a major dimension perpendicular to a line joining the center of the outlet entrance to the center of the wall. In selected configurations, opposing faces of the walls bounding the open-end channel are convex in the horizontal plane and concave in the horizontal plane, respectively.

12 Claims, 18 Drawing Sheets

DOUBLE ENTRY CHANNEL LADLE BOTTOM

BACKGROUND OF THE INVENTION (1) Field of the Invention

This invention relates generally to refractory articles and, more particularly, to a refractory shape used in the transfer of molten metal in a continuous casting operation.

(2) Description of Related Art Including Information Disclosed Under 37 CFR 1.97 and 1.98.

A ladle is a vessel that is used to hold or transport a batch of liquid metal during metallurgical operations. A layer of slag frequently covers the top surface of the liquid metal, such as in the production of steel. When desired, the liquid metal may be drained from the ladle though an outlet located in the ladle bottom. While draining, the metal will, desirably and advantageously, completely empty from the ladle without contamination of the metal by slag. Contamination is undesirable and may cause difficulties in casting or refining operations as well as defects in the intermediate or final metal products.

Slag contamination can occur from both floating and entrained slag. Slag is typically less dense than liquid metal and generally floats in a separated layer on the surface of a quiescent batch of liquid metal. During the pouring of the liquid metal, slag can become entrained within the flowing stream. Entrainment is the presence of slag particles in the molten steel. Entrainment often occurs when turbulence disturbs the interface between molten metal and slag. Such turbulence can cause molten metal and slag to mix. Under quiescent conditions, entrained slag would eventually float to the surface; however, the turbulence of casting can maintain a substantial amount of entrained slag in the molten metal.

As the metal drains from the ladle, the floating slag approaches the outlet and the likelihood of contamination of the metal stream by slag increases. An operator will stop the pour when he detects slag in the molten metal stream exiting the ladle. The operator may even stop the pour prematurely to avoid slag in the ladle outflow. The slag and metal remaining in the ladle are discarded. Discarding metal decreases yield, which is costly and inefficient but, at the same time, is necessary to reduce slag contamination.

Various methods and articles exist to detect slag in the ladle or the ladle outflow. Frequently, these methods require action by the operator and include electronic and sonic detection devices that are placed inside and outside the ladle. For example, a detector placed in the ladle can detect a drop in the level of molten metal by measuring a change in electrical resistivity when floating slag intersects the submerged detector. Similarly, sonic pulses can identify the presence of slag in the ladle outflow. Both techniques only detect the presence of slag and do not actively decrease the presence of slag in the outflow.

The phenomenon of vortexing contributes to slag entrainment in the ladle outflow. Vortexing is the development of fluid motion dominated by rotation around an isolated curved line in space, as in a whirlpool. In the ladle, this motion develops around a curved line passing through the outlet of the ladle. Vortices, once created, have a tendency to persist.

The prior art discloses various configurations for the reduction of vortexing. One such configuration includes elongated castellations that approach the outlet. One embodiment shows castellations radiating symmetrically from the outlet. The symmetrical castellations are described as reducing vortexing. However, this configuration has not been optimized for vortexing reduction.

A need remains for an article in which vortexing and resulting slag entrainment are minimized.

BRIEF SUMMARY OF THE INVENTION

Accordingly, a ladle bottom configuration has been developed in which vortexing has been minimized. This configuration increases the efficiency of a ladle draining operation, including reducing the amount of discarded metal, avoiding the premature flow of slag through the outlet, and reducing the contamination of slag in the molten metal effluent.

The present invention relates to a metallurgical ladle, a bottom of the metallurgical ladle, and especially an outlet block, having an outlet through which the molten metal can drain and a method to increase the fraction of liquid metal that can be drained from the ladle through the outlet without contamination by slag.

The invention includes a ladle bottom and an outlet block having an outlet channel. The channel is formed by two walls separated by a distance W. The walls may be supported by, or an extension of, a block that contains the ladle block outlet. Alternatively, a first wall may be supported by, or an extension of, a block that contains the ladle block outlet, and the ladle block may be configured so that, in use, another portion of the ladle bottom, or a separate structure attached to the ladle bottom, serves as a second channel wall on the opposite side of the ladle block outlet from the first wall. In particular embodiments, a first wall has a major dimension perpendicular to a line joining the center of the outlet channel entrance to the center of the wall. The ladle bottom outlet lies between the two walls. The two walls have a length L. The ladle bottom outlet has a main dimension D at its entrance. It has been found that a configuration in which $D \leq L \leq 5$ D, $\frac{1}{2}D \leq W \leq 3.5$ D, and $0.8 \leq L/W \leq 2.5$ produces a reduction in vortexing. In certain embodiments, $D \leq W \leq 3.5$ D. In certain embodiments, $H > D$. It has also been found that configurations in which a wall is convex or concave in horizontal section, and configurations in which opposing walls separated by the outlet port form a convex/concave pair, produce a reduction in vortexing. Convexity and concavity in these walls may be in the form of a smooth curve projected to form a smooth curved surface, may take the form of a series of lines projected to form planar facets, or may be a combination of one or more smooth curves and one or lines projected to form a surface containing both smooth curve portions and planar facet portions. In addition, one or each of the walls may contain a curved indentation at its midpoint.

BRIEF DESCRIPTION OF THE SEVERAL VIEWS OF THE DRAWING(S)

DETAILED DESCRIPTION OF THE INVENTION

Figure 1:
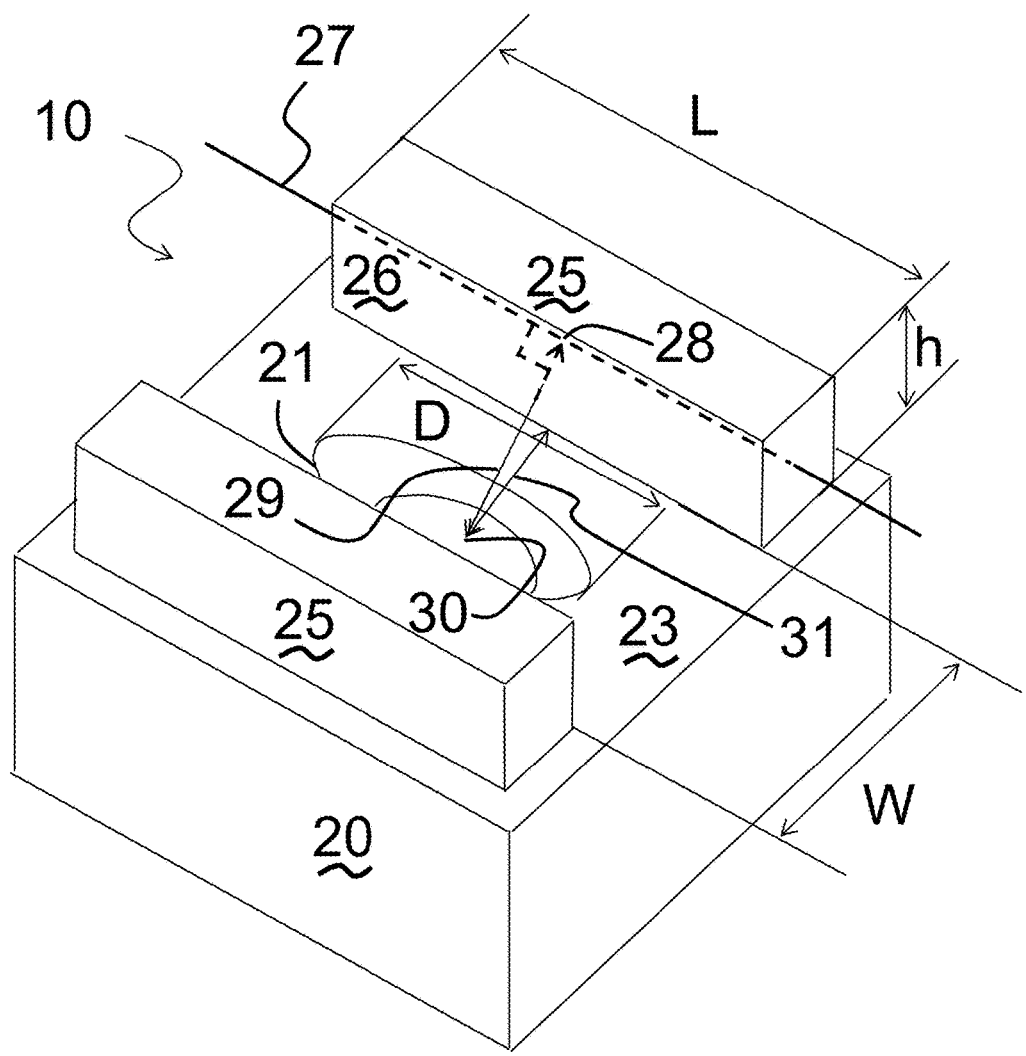
FIG. 1 is a schematic representation of a ladle block of the present invention.

FIG. 1 shows one embodiment of a ladle block 10 of the present invention. The ladle block 10 contains a ladle block body 20, through which an outlet bore 21 passes downwardly from a ladle block body upper surface 23. Walls 25 extend upwardly from ladle block body 20. Walls 25 are disposed on opposite sides of outlet bore 21. Walls 25 are separated by an outlet channel having a width of W. Walls 25 have a height denoted by h. Walls 25 have a length denoted by L. Outlet bore 21 has a main dimension denoted by D. Wall interior surface 26 is the portion of wall 25 facing the volume above outlet bore 21.

Outlet bore 21 may have an entrance in ladle block body upper surface 23 in the shape of a circle or in the shape of an oval. The entrance of outlet bore 21 may be circular, or may describe an oval. The main dimension D of outlet bore 21 may be parallel to the length L of walls 25. The surface of outlet bore 21 descending from ladle block body upper surface 23 may include a frustoconical portion. Normally, the outlet is at the low point of the ladle.

In certain embodiments of the invention, a single wall extends upwardly from ladle block body 20. In such configurations, the outlet channel is defined by ladle block body upper surface 23, wall 25, and a cooperating surface located across the outlet bore from the single wall. For a single-wall configuration, W/2 is the distance from the wall interior surface to the center point of the bore. Particular embodiments of the invention having a single wall or two walls may be defined as a refractory ladle block comprising a ladle block body having an upper surface and defining an outlet bore having a center in the plane of the ladle block body upper surface, the refractory ladle block further comprising a wall 25 having a major horizontal axis 27 and an interior surface 26 adjacent to the outlet bore, wherein the major horizontal axis has a center point 28, wherein the line 29 passing through the center 30 of the outlet bore in the plane of the ladle block body upper surface and the centerpoint of the major horizontal axis 28 is perpendicular to the major horizontal axis, wherein the distance 31 from the center of the outlet bore 30 in the plane of the ladle block body upper surface to the wall interior surface is W/2, and wherein ½ D≤W. In particular embodiments, D≤W, or D≤W≤3.5 D. Opposite ends of the wall are disposed in proximity to opposite ends of the major horizontal axis.

It has been found that a configuration in which D≤L≤5 D, D≤W≤3.5 D, and 0.8≤L/W≤2.5 produces a reduction in vortexing. In particular configurations, 1≤L/W≤1.5.

In use, the ladle block body may be set into, and surrounded by, a ladle bottom. Not shown in FIG. 1 are the walls of the ladle that would extend upward from the ladle bottom to contain the liquid metal and slag. Outlet bore 21 is normally at the low point of the ladle.

Exposed wall surfaces may include horizontal faces, faces at an angle to the horizontal and sidewalls that are exposed to liquid metal. Sidewalls may be vertical or substantially vertical relative to the ladle bottom. The sidewalls may be curved, chamfered or otherwise shaped to permit head pressure on the flow above the outlet and decrease slag contamination.

As molten metal exits the ladle through the outlet bore, the level of molten metal in the ladle, with slag floating on it, decreases. The wall or walls of the ladle block prevent vortexing; the geometric relationship of the elements of the ladle block is believed to prevent flow rotation around a vertical axis that would produce vortexing. Horizontal ladle bottom surfaces having a higher elevation than the ladle block body upper surface take advantage of lower density of slag and its higher viscosity in comparison to liquid metal to collect or trap slag while permitting molten metal to continue towards the outlet.

Figure 2:
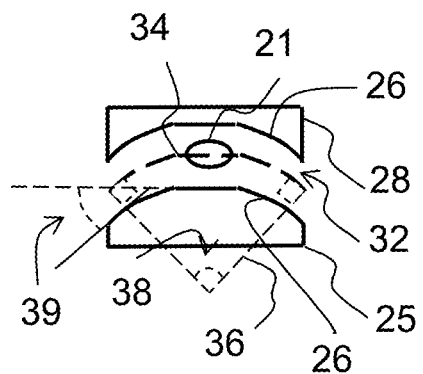
FIG. 2 is a schematic representation of selected components of a ladle block of the present invention.

FIG. 2 is a representation of a planar section of selected elements of a ladle block of the present invention. In this representation, outlet bore 21 is adjacent to a pair of walls 25, one of which has a convex surface in the horizontal plane facing outlet bore 21, and the other of which has a concave surface in the horizontal plane facing outlet bore 21. Each wall has a straight central portion as viewed in this section and flanking curved portions as viewed in this section. Wall interior surfaces 26 are the portions of walls 25 facing the volume above outlet bore 21. Channel 32 is the volume contained by walls 25 between wall interior surfaces 26. Channel center line 34 is the center of channel 32 equidistant from wall interior surfaces 26, exclusive of rounding and beveling at the ends of wall interior surfaces 26. Channel center line radii 36 are lines perpendicular to channel center line 34 at its endpoints; they intersect at channel center line described angle 38. Channel center line described angle 38 may have values within the range from 5-120 degrees, 5-110 degrees, 5-100 degrees, or 5-90 degrees. Channel exit angle 39 is the angle of the center of wall interior surface 26 to the end of wall interior surface 26, and may have values within the range from 0-40 degrees, 5-30 degrees, 0-30 degrees, 5-25 degrees, 0-25 degrees, 5-20 degrees or 0-20 degrees. Channel exit angle 39 is measured without respect to chamfering or rounding at the ends of wall interior surfaces. It has been found that channel exit angles within the stated ranges contribute to a reduction in vortexing.

Figure 3:
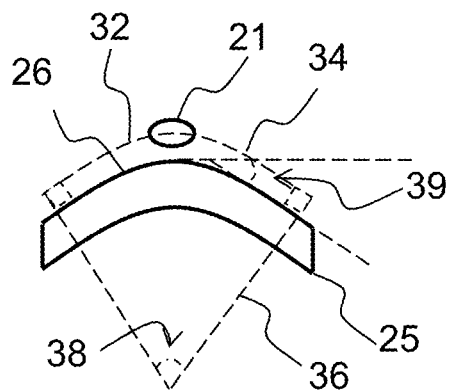
FIG. 3 is a schematic representation of selected components of a ladle block of the present invention.

FIG. 3 is a representation of a planar section of selected elements of a ladle block of the present invention. In this representation, outlet bore 21 is adjacent to a wall 25, which is convex surface facing outlet bore 21. Wall interior surface 26 is the portion of wall 25 facing the volume above outlet bore 21. Channel center line 34 is a line at a constant distance from wall interior surface 26 (exclusive of rounding and beveling at the ends of wall interior surface 26) passing through the center of outlet bore 21. Channel center line radii 36 are lines perpendicular to channel center line 34 at its endpoints; they intersect at channel center line described angle 38. Channel center line described angle 38 may have values within the range from 5-120 degrees, 5-110 degrees, 5-100 degrees, or 5-90 degrees. Channel exit angle 39 is the angle of the center of wall interior surface 26 to the end of wall interior surface 26, and may have values within the range from 0-40 degrees, 5-30 degrees, 0-30 degrees, 5-25 degrees, 0-25 degrees, 5-20 degrees or 0-20 degrees. Channel exit angle 39 is measured without respect to chamfering or rounding at the ends of wall interior surfaces.

Figure 4:
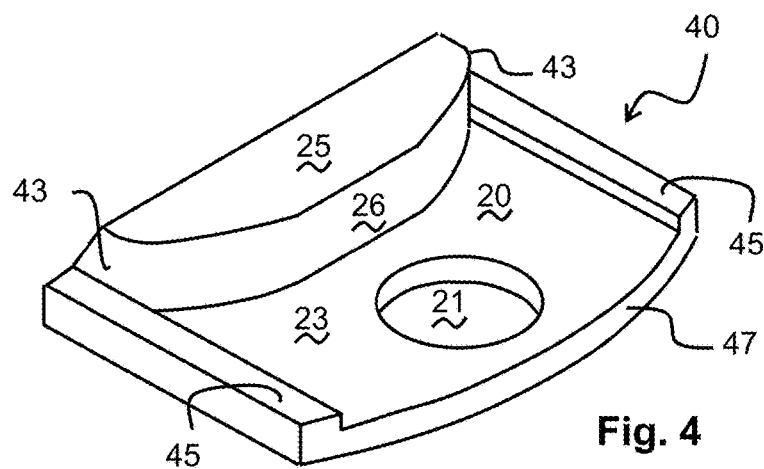
FIG. 4 is a perspective drawing of a ladle block of the present invention (Embodiment A).

FIG. 4 is a representation of a single-wall ladle block 40 according to the present invention, having a ladle block body 20 through which outlet bore 21 passes downwardly from ladle block body upper surface 23. Outlet bore 21 is adjacent to wall 25 protruding upwardly from ladle block body 20. Wall interior surface 26 is the surface of wall 25 adjacent to outlet bore 21. Each end of wall interior surface 26 terminates in a wall flared portion 43. On each end of ladle block body 20 a threshold 45 protrudes upwardly. Ladle block mating surface 47 is located on the side of ladle block body 20 opposite wall 25; ladle block mating surface 47 is configured to mate with a separate refractory piece forming a wall adjacent to ladle block body upper surface 23, or to mate with the interior radial surface of a ladle bottom which may perform the function of a wall.

Figure 5:
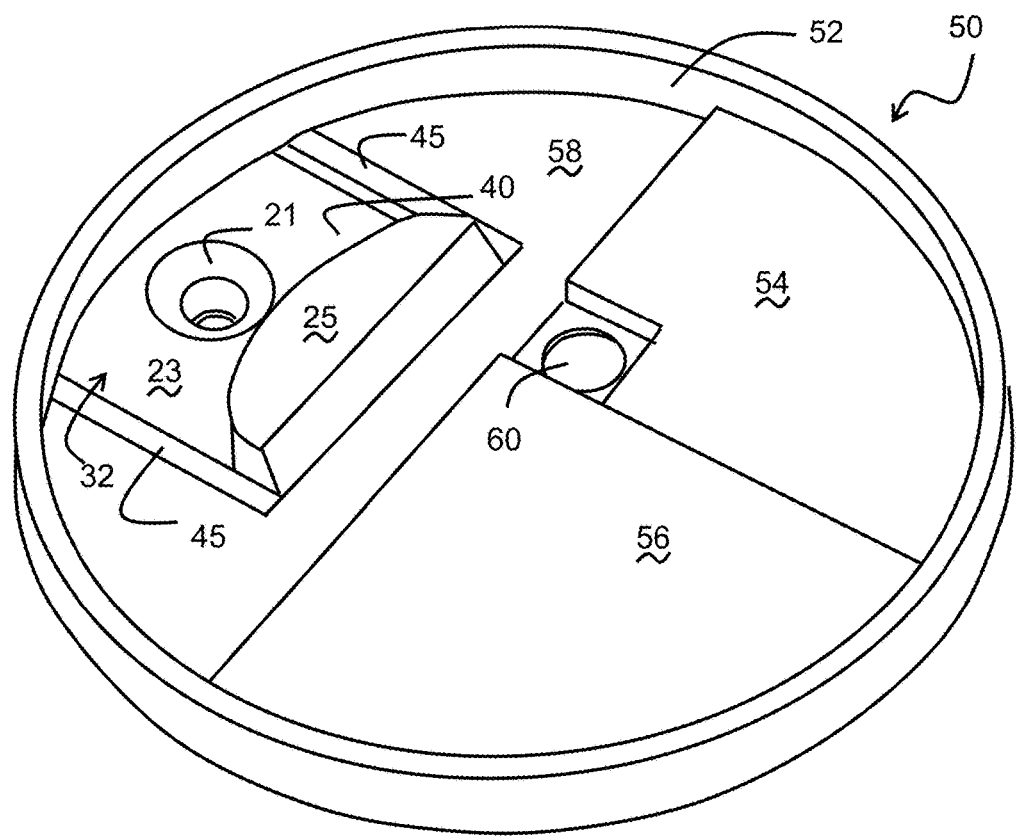
FIG. 5 is a perspective drawing of a ladle bottom of the present invention (Embodiment A).

FIG. 5 is a perspective representation of a ladle bottom 50 in which a single-wall ladle block 40 has been installed (Embodiment A). Not shown are the upper portions of the walls of the ladle that would extend upward from the portion of the ladle bottom shown to contain the liquid metal and slag. Ladle bottom 50 has a ladle bottom interior radial surface 52; single-wall, threshold ladle block 40 has been installed in ladle bottom 50 so that the mating surface (not visible in this view) of the ladle block is in contact with interior radial surface 52. Upper terrace impact zone 54 and upper terrace adjacent zone 56 extend upwardly from the bottom inner surface of ladle bottom 50. Intermediate terrace 58 has a lesser height than either upper terrace impact zone 54 or upper terrace adjacent zone 56. Purging plug 60 is installed in ladle bottom 50 at a location with the same altitude or lesser altitude than intermediate terrace 58; in this embodiment, purge plug 60 is installed in an area adjacent to intermediate terrace 58 and at a lower altitude than intermediate terrace 58. In the embodiment depicted, ladle block 40 is installed in ladle bottom 50 so that threshold 45 has the same altitude as intermediate terrace 58. Channel 32 is formed above ladle block body upper surface 23 and between wall 25 and ladle bottom interior radial surface 52. In the embodiment depicted, outlet bore 21 has a circular cross section. The upper portion of the interior surface of outlet bore 21 takes the form of the surface of a frustum or inverted truncated conical surface joined, at the end having a smaller radius, to a cylindrical surface.

Figure 6:
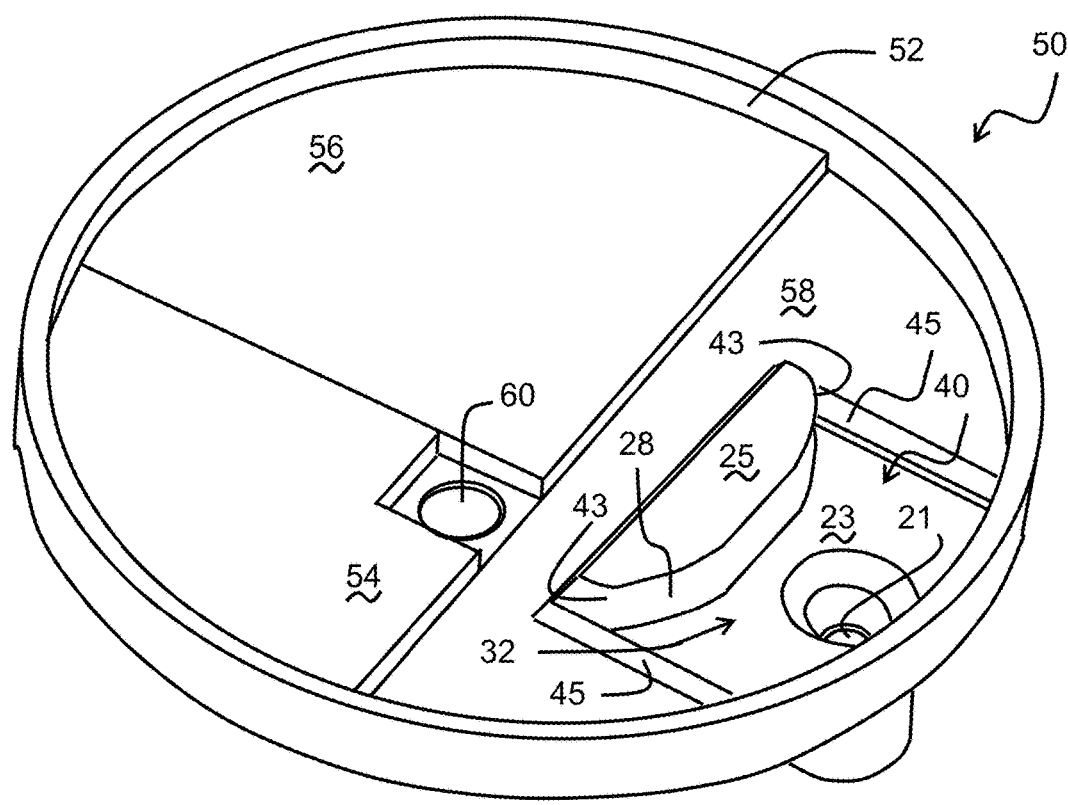
FIG. 6 is a perspective drawing of a ladle bottom of the present invention (Embodiment A).

FIG. 6 is a perspective representation of a ladle bottom 50 in which a single-wall ladle block 40 has been installed (Embodiment A). Ladle bottom 50 has a ladle bottom interior radial surface 52; single-wall, threshold ladle block 40 has been installed in ladle bottom 50 so that the mating surface (not visible in this view) of the ladle block is in contact with interior radial surface 52. Upper terrace impact zone 54 and upper terrace adjacent zone 56 extend upwardly from the bottom inner surface of ladle bottom 50. Intermediate terrace 58 has a lesser height than either upper terrace impact zone 54 or upper terrace adjacent zone 56. Purging plug 60 is installed in ladle bottom 50 at a location with the same altitude or lesser altitude than intermediate terrace 58; in this embodiment, purge plug 60 is installed in an area adjacent to intermediate terrace 58 and at a lower altitude than intermediate terrace 58. In the embodiment depicted, ladle block 40 is installed in ladle bottom 50 so that threshold 45 has the same altitude as intermediate terrace 58. Channel 32 is formed above ladle block body upper surface 23 and between the interior surface 26 of wall 25 and ladle bottom interior radial surface 52. Interior surface 26 terminates at flared portion 43. In the embodiment depicted, outlet bore 21 has a circular cross section. The upper portion of the interior surface of outlet bore 21 takes the form of the surface of a frustum or inverted truncated conical surface joined, at the end having a smaller radius, to a cylindrical surface.

A particular embodiment of the device depicted in FIGS. 5-6 has geometrical relationships described in terms of D, the diameter of bore 21 at ladle block body upper surface 23, L, the straight-line distance from one end of each wall 25 to the other end, W, the distance between the channel wall 25 (exclusive of flared portions 43) and ladle block mating surface 47, and H, the distance from ladle block body upper surface 23 to the top of wall 25. For a value of D of 246 mm, a configuration in which D≤W≤3.5 D (W in the range 246 mm-861 mm), D≤L≤5 D (L in the range 246 mm-1230 mm), 0.8≤L/W≤2.5, and H≥1 D (equal to or greater than 246 mm) produces a reduction in vortexing. Values of 675 mm for W, 246 mm for D, 611 mm for L, an L/W ratio of 0.9, a channel height of 272 mm and an angle of 20 degrees between the center line of the channel at the wall 25 midpoint and the center line of the channel at an end of the channel satisfy these criteria.

Figure 7:
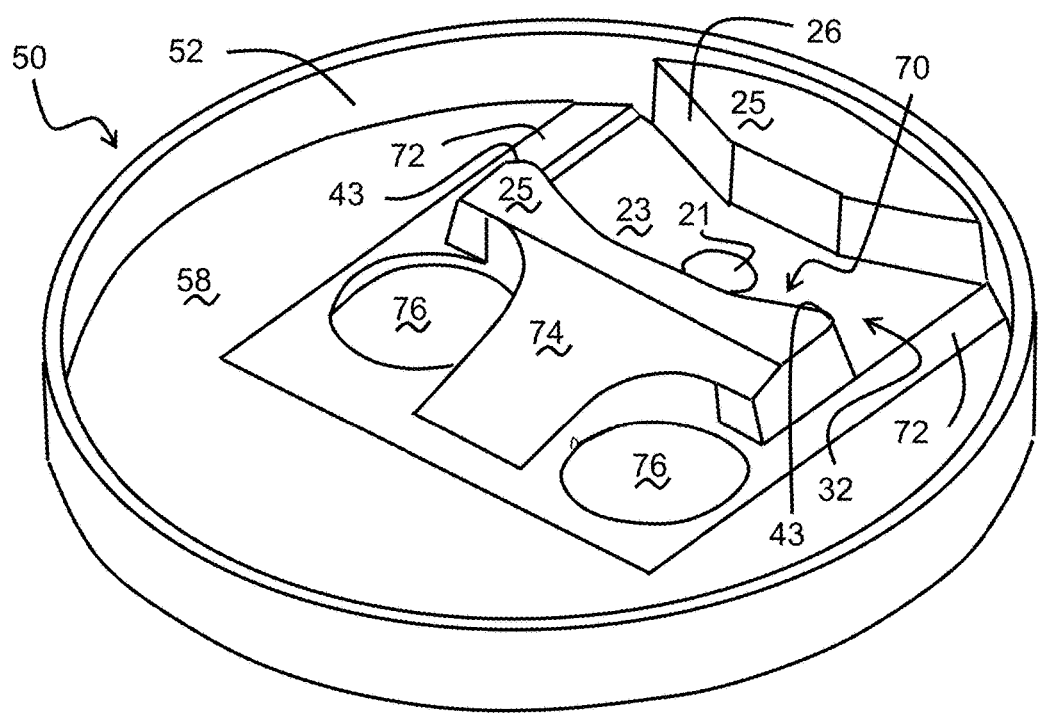
FIG. 7 is a perspective drawing of a ladle bottom of the present invention (Embodiment B).

FIG. 7 is a perspective representation of a ladle bottom 50 in which a double-wall ladle block 70 has been installed (Embodiment B). Ladle bottom 50 has a ladle bottom interior radial surface 52; double-wall ladle block 70 has been installed in ladle bottom 50 so that the mating surface (not visible in this view) of the ladle block is in contact with interior radial surface 52. Intermediate terrace 58 extends upwardly from the inner surface of the bottom of the ladle bottom and partially surrounds threshold zones 72. Threshold zones 72 are configured in ladle bottom 50 so that a threshold zone 72 has the same altitude as intermediate terrace 58. Ladle block 70 is installed in ladle bottom 50 so that ladle block body upper surface 23 has a lower altitude than, and is adjacent to, each of threshold zones 72.

In the embodiment depicted in FIG. 7, walls 25 extend upwardly from ladle block body upper surface 23 on opposite sides of outlet bore 21. Channel 32 is formed above ladle block body upper surface 23 and between the interior surfaces 26 of walls 25. In this embodiment, one interior surface 26 is a faceted concave surface; the other interior surface 26 is a faceted convex surface. In this embodiment, the interior surface 26 that is a faceted concave surface terminates at flared portions 43. In the embodiment depicted, outlet bore 21 has a circular cross section. The upper portion of the interior surface of outlet bore 21 takes the form of the surface of a frustum or inverted truncated conical surface joined, at the end having a smaller radius, to a cylindrical surface. A ladle block ramp 74 extends from the side of wall 25 having the faceted interior convex surface in the direction away from outlet bore 21; the ramp decreases in altitude as it extends away from outlet bore 21. Vertical openings in intermediate terrace 58 accommodate port plugs 76.

Figure 8:
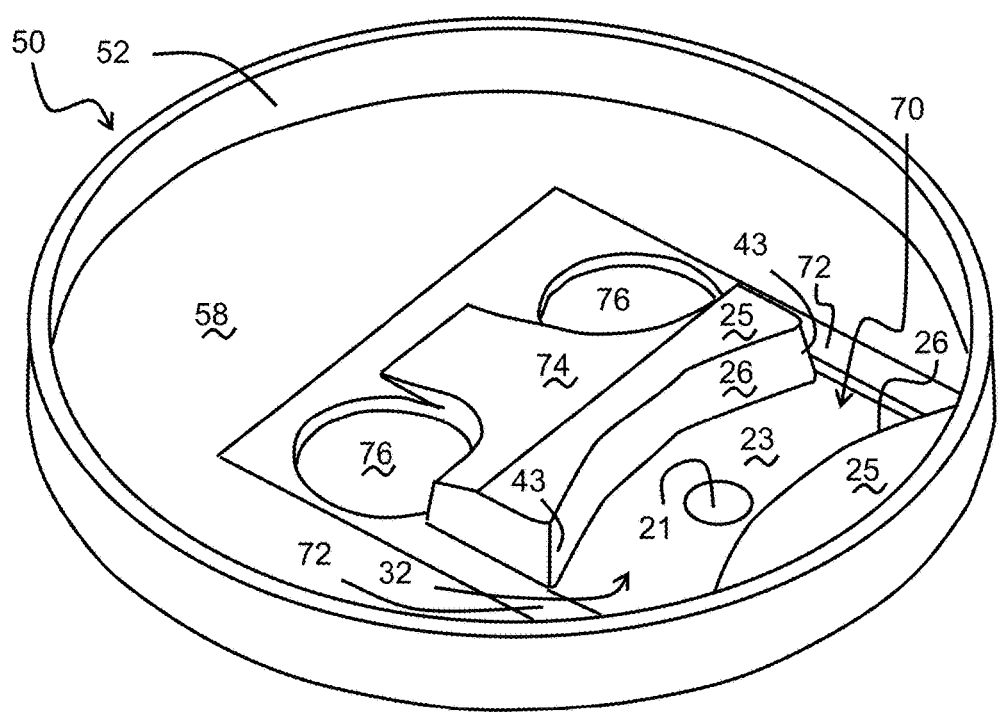
FIG. 8 is a perspective drawing of a ladle bottom of the present invention (Embodiment B).

FIG. 8 is a perspective representation of a ladle bottom 50 in which a double-wall ladle block 70 has been installed (Embodiment B). Ladle bottom 50 has a ladle bottom interior radial surface 52; double-wall ladle block 70 has been installed in ladle bottom 50 so that the mating surface (not visible in this view) of the ladle block is in contact with interior radial surface 52. Intermediate terrace 58 extends upwardly from the inner surface of the bottom of the ladle bottom and partially surrounds each threshold zone 72. Threshold zones 72 are configured in ladle bottom 50 so that each threshold zone 72 has the same altitude as intermediate terrace 58. Ladle block 70 is installed in ladle bottom 50 so that ladle block body upper surface 23 has a lower altitude than, and is adjacent to, each threshold zone 72.

In the embodiment depicted in FIG. 8, walls 25 extend upwardly from ladle block body upper surface 23 on opposite sides of outlet bore 21. Channel 32 is formed above ladle block body upper surface 23 and between the interior surfaces 26 of walls 25. In this embodiment, one interior surface 26 is a faceted concave surface; the other interior surface 26 is a faceted convex surface. In this embodiment, the interior surface 26 that is a faceted concave surface terminates at flared portions 43. In the embodiment depicted, outlet bore 21 has a circular cross section. The upper portion of the interior surface of outlet bore 21 takes the form of the surface of a frustum or inverted truncated conical surface joined, at the end having a smaller radius, to a cylindrical surface. A ladle block ramp 74 extends from the side of wall 25 having the faceted interior convex surface in the direction away from outlet bore 21; the ramp decreases in altitude as it extends away from outlet bore 21. Vertical openings in intermediate terrace 58 accommodate port plugs 76.

Figure 9:
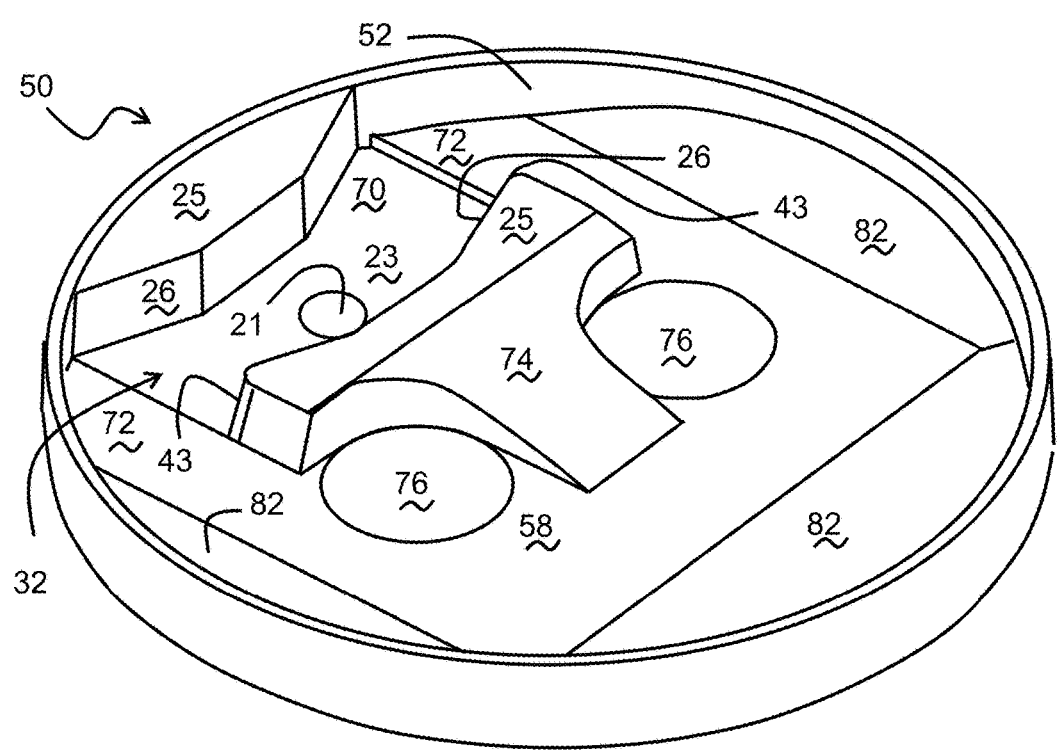
FIG. 9 is a perspective drawing of a ladle bottom of the present invention (Embodiment C).

FIG. 9 is a perspective representation of a ladle bottom 50 in which a double-wall ladle block 70 has been installed (Embodiment C). Ladle bottom 50 has a ladle bottom interior radial surface 52; double-wall, threshold ladle block 70 has been installed in ladle bottom 50 so that the mating surface (not visible in this view) of the ladle block is in contact with interior radial surface 52. Intermediate terrace 58 extends upwardly from the inner surface of the bottom of the ladle bottom. Threshold zones 72 are zones, in proximity to the ends of walls 25, having the same altitude as intermediate terrace 58. Ladle block 70 is installed in ladle bottom 50 so that ladle block body upper surface 23 has a lower altitude than, and is adjacent to, each threshold zone 72. Angled regions 82 are angled downwards and away from ladle bottom interior radial surface 52; at their lowest points they have the altitude of intermediate terrace 58, to which they are adjacent.

In the embodiment depicted in FIG. 9, channel 32 is formed above ladle block body upper surface 23 and between the interior surfaces 26 of walls 25. In this embodiment, one interior surface 26 is a faceted concave surface; the other interior surface 26 is a faceted convex surface. In this embodiment, the interior surface 26 that is a faceted concave surface terminates at flared portions 43. In the embodiment depicted, outlet bore 21 has a circular cross section. The upper portion of the interior surface of outlet bore 21 takes the form of the surface of a frustum or inverted truncated conical surface joined, at the end having a smaller radius, to a cylindrical surface. A ladle block ramp 74 extends from the side of wall 25 having the faceted interior convex surface; the ramp decreases in altitude as it extends away from outlet bore 21. Vertical openings in intermediate terrace 58 accommodate port plugs 76.

Figure 10:
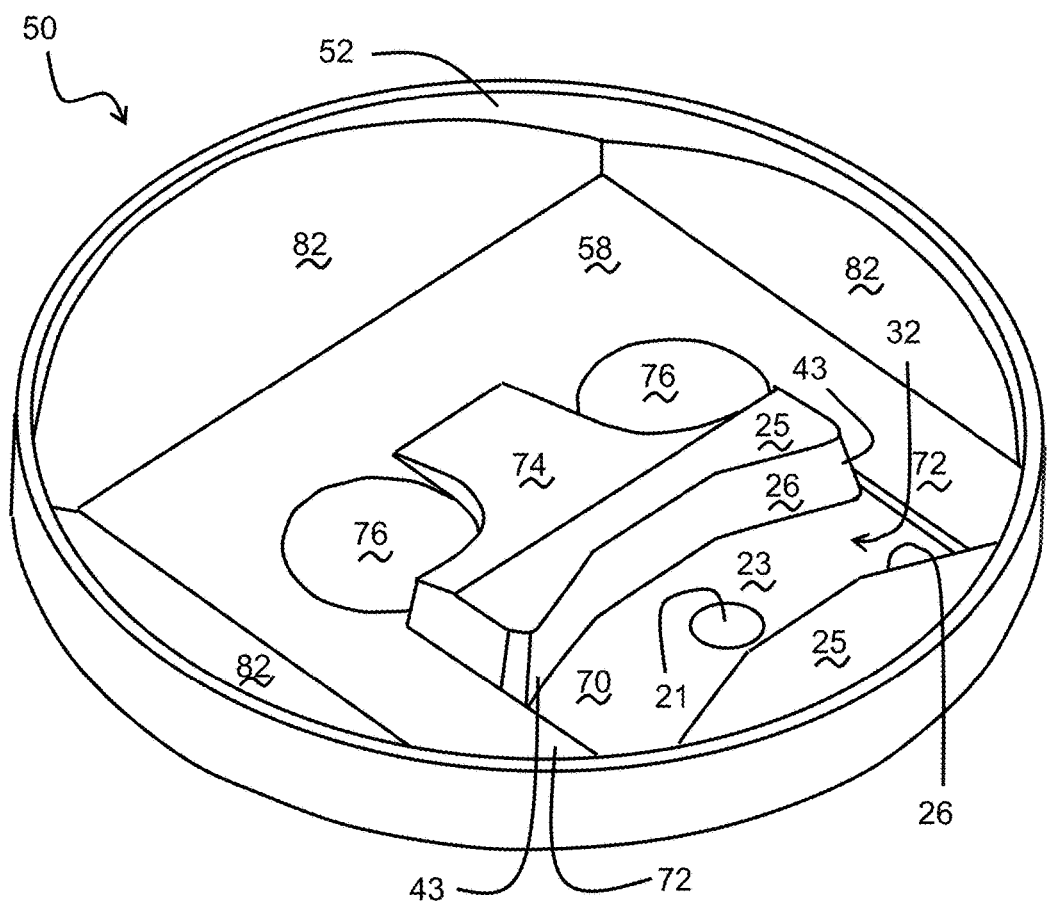
FIG. 10 is a perspective drawing of a ladle bottom of the present invention (Embodiment C).

FIG. 10 is a perspective representation of a ladle bottom 50 in which a double-wall ladle block 70 has been installed (Embodiment C). Ladle bottom 50 has a ladle bottom interior radial surface 52; double-wall, threshold ladle block 70 has been installed in ladle bottom 50 so that the mating surface (not visible in this view) of the ladle block is in contact with interior radial surface 52. Intermediate terrace 58 extends upwardly from the inner surface of the bottom of the ladle bottom. Threshold zones 72 are zones, in proximity to the ends of walls 25, having the same altitude as intermediate terrace 58. Ladle block 70 is installed in ladle bottom 50 so that ladle block body upper surface 23 has a lower altitude than, and is adjacent to, each threshold zone 72. Angled regions 82 are angled downwards and away from ladle bottom interior radial surface 52; at their lowest points they have the altitude of intermediate terrace 58, to which they are adjacent.

In the embodiment depicted in FIG. 10, channel 32 is formed above ladle block body upper surface 23 and between the interior surfaces 26 of walls 25. In this embodiment, one interior surface 26 is a faceted concave surface; the other interior surface 26 is a faceted convex surface. In this embodiment, the interior surface 26 that is a faceted concave surface terminates at flared portions 43. In the embodiment depicted, outlet bore 21 has a circular cross section. The upper portion of the interior surface of outlet bore 21 takes the form of the surface of a frustum or inverted truncated conical surface joined, at the end having a smaller radius, to a cylindrical surface. A ladle block ramp 74 extends from the side of wall 25 having the faceted interior convex surface; the ramp decreases in altitude as it extends away from outlet bore 21. Vertical openings in intermediate terrace 58 accommodate port plugs 76.

A particular embodiment of the device depicted in FIGS. 7-10 has geometrical relationships described in terms of D, the diameter of bore 21 at ladle block body upper surface 23; L, the straight-line distance from one end of each wall 25 to the other end; W, the distance between the walls of channel 32 exclusive of flared portions 43; and H, the distance from ladle block body upper surface 23 and the top of wall 25. For a value of D of 177 mm, a configuration in which D≤W≤3.5 D (W in the range 177 mm-619 mm), D≤L≤5 D (L in the range 177 mm-885 mm), 0.8≤L/W≤2.5, and H≥1 D (equal to or greater than 200 mm) produces a reduction in vortexing. Values of 483 mm for W, 177 mm for D, 592 mm for L, an L/W ratio of 0.9, a channel height of 200 mm and an angle of 13.6 degrees between the center line of the channel at the wall 25 midpoint and the center line of the channel at an end of the channel satisfy these criteria.

Figure 11:
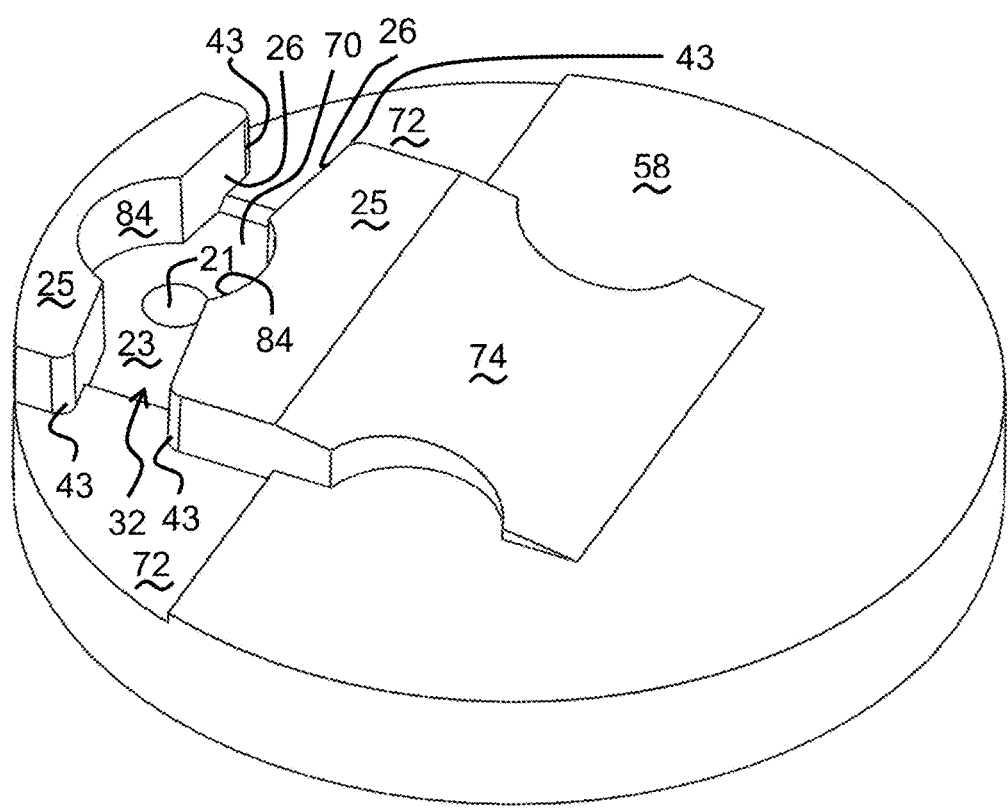
FIG. 11 is a perspective drawing of refractory components of a ladle bottom of the present invention (Embodiment D).

FIG. 11 is a perspective representation of the refractory portion of a ladle bottom in which a double-wall ladle block 70 has been installed (Embodiment D). Intermediate terrace 58 extends upwardly from the inner surface of the bottom of the ladle bottom. Threshold zones 72 are zones, in proximity to the ends of walls 25, having the same altitude as intermediate terrace 58. Ladle block 70 is installed in the ladle bottom so that ladle block body upper surface 23 has a lower altitude than, and is adjacent to, threshold zone 72.

In the embodiment depicted in FIG. 11, channel 32 is formed above ladle block body upper surface 23 and between the interior surfaces 26 of walls 25. Walls 25 may be supported by, or an extension of, the block that contains the ladle block outlet. In this embodiment, one interior surface 26 is a faceted concave surface; the other interior surface 26 is a faceted convex surface. In this embodiment, the interior surfaces 26 terminate at flared portions 43. In the embodiment depicted, outlet bore 21 has a circular cross section. A ladle block ramp 74 extends from the side of wall 25 having the faceted interior convex surface; the ramp decreases in altitude as it extends away from outlet bore 21. Each wall interior surface 26 houses a recess 84; in this embodiment, the surface of each recess 84 takes the form of a portion of the radial surface of a cylinder coaxial with the extended axis of bore 21.

In certain embodiments of the invention the dimension W, the channel width, includes the dimensions of recess 84. In other embodiments of the invention, the dimensions of recess 84 are excluded when the dimension W, the channel width, is related to other dimensions. W is measured at the altitude of ladle block body upper surface 23.

A particular embodiment of the device depicted in FIG. 11 has geometrical relationships described in terms of D, the diameter of bore 21 at ladle block body upper surface 23; L, the straight-line distance from one end of each wall 25 to the other end; W, the distance between the walls of channel 32 exclusive of flared portions 43 or recesses 84; and H, the channel height defined as the distance from ladle block body upper surface 23 to the top of a wall 25. For a value of D of 200 mm, a configuration in which $D \leq W \leq 3.5$ D (W in the range 200 mm-700 mm), $D \leq L \leq 5$ D (L in the range 200 mm-1000 mm), $0.8 \leq L/W \leq 2.5$ and $H \geq 1.1$ D produces a reduction in vortexing. Values of 317 mm for W, 200 mm for D, 660 mm for L, 2.08 for L/W, a channel height of 250 mm, and an angle of 10 degrees between the center line of the channel at the wall 25 midpoint and the center line of the channel at an end of the channel satisfy these criteria.

Figure 12:
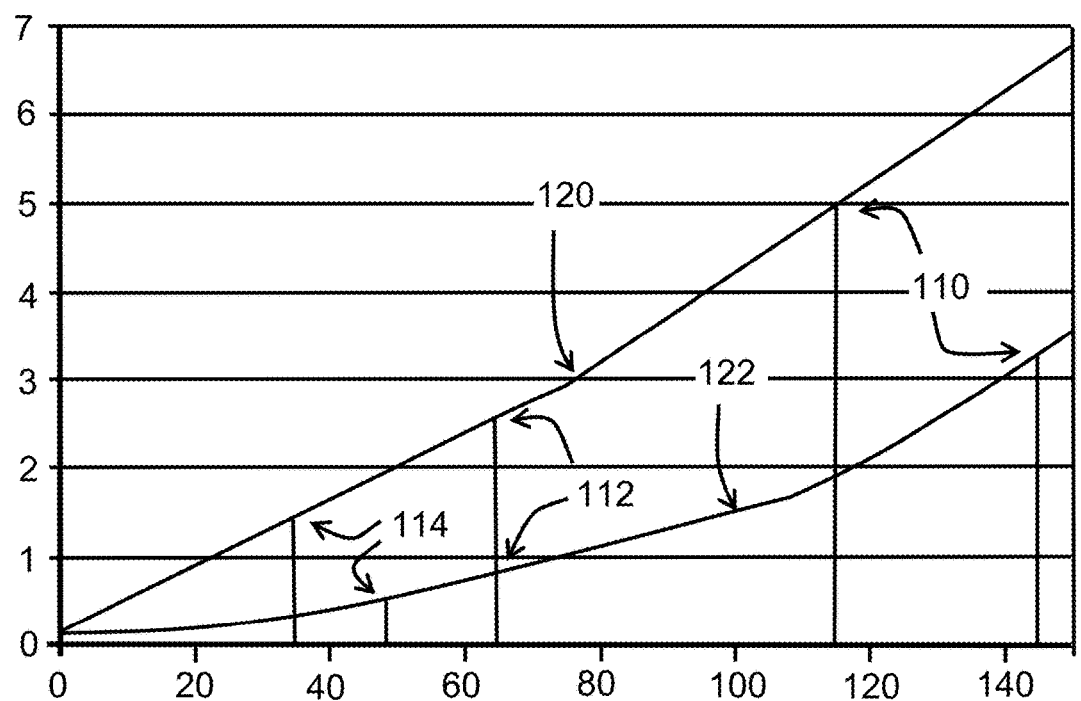
FIG. 12 is a graphical representation of the performance of ladle bottoms of the prior art and Embodiment A.

FIG. 12 compares results obtained with a bricked ladle bottom of the prior art, and a ladle bottom into which a single-walled ladle block according to the present invention, embodiment A as illustrated in FIGS. 5-6, is installed. In this embodiment of the invention, the channel over the outlet bore is defined by the ladle block body upper surface, a ladle block wall and a portion of the ladle bottom interior radial surface. The abscissa of the graph shows the steel level over the outlet, measured in millimeters. The ordinate shows the steel residual weight in tons. Points 110 of the graph show the level at which weak vortexing commences, corresponding to 5 tons (4500 kg) of steel remaining in the prior art vessel, and 3.2 tons (2900 kg) of steel remaining in the vessel of the present invention. Points 112 of the graph show the level at which strong vortexing commences, corresponding to 2.5 tons (2300 kg) of steel remaining in the prior art vessel, and 0.8 tons (730 kg) of steel in the vessel of the present invention. Points 114 of the graph show the level at which surface collapse occurs. In the prior art ladle bottom, surface collapse starts when the steel height reaches 35 mm. This corresponds to 1.4 tons (1300 kg) of steel remaining in the prior art vessel. In the vessel of the present invention, 0.5 tons (460 kg) of steel remain in the vessel when surface collapse occurs. Line 120 shows values obtained for a ladle bottom and ladle block of the prior art. Line 122 shows values obtained for a ladle bottom and a ladle block (Embodiment A) of the present invention.

Figure 13:
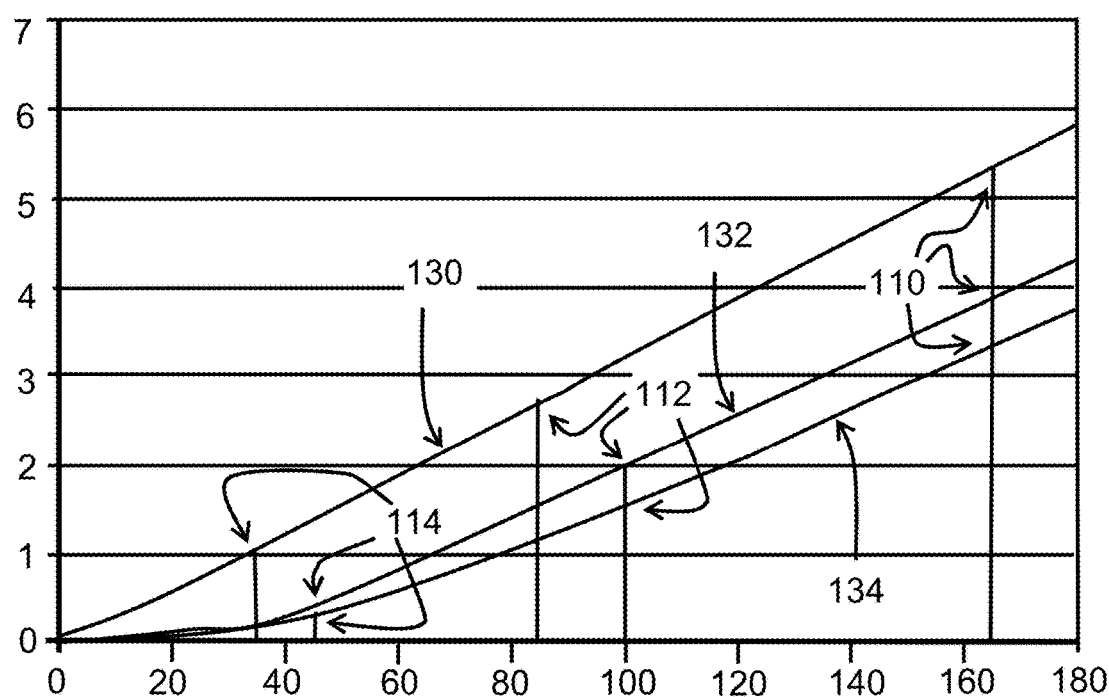
FIG. 13 is a graphical representation of the performance of ladle bottoms of the prior art and Embodiments B and C.

FIG. 13 shows a comparison of results obtained with a bricked ladle bottom of the prior art, and a ladle bottom into which a ladle block according to the present invention, as illustrated in FIGS. 7-8, and 9-10, is installed. In this embodiment of the invention, the channel over the outlet bore is defined by the ladle block body upper surface and two ladle block walls on opposite sides of the outlet bore. Points 110 of the graph show the levels at which weak vortexing can start during ladle draining over the outlet. For the prior art configuration, weak vortexing occurs with 5.2 tons (4700 kg) of residual steel. Weak vortexing occurs with 3.8 tons (3400 kg) of residual steel for the embodiment B of FIGS. 7-8, and with 3.3 tons (3000 kg) of residual steel for embodiment C of FIGS. 9-10. Points 112 of the graph show the levels at which a strong vortex can start during ladle draining over the outlet. For the prior art configuration, a strong vortex can form at 85 mm or 2.6 tons (2400 kg) of steel. Early vortexing occurs at 100 mm or 1.9 tons (1700 kg) with embodiment B of FIGS. 7-8, and at 100 mm or 1.5 tons (1400 kg) with embodiment C of FIGS. 9-10. Points 114 of the graph show the levels at which surface collapse occurs during ladle draining over the outlet. For the prior art configuration, surface collapse starts when the steel height reaches 35 mm, which corresponds to 1.0 ton (910 kg) of steel remaining in the vessel. Surface collapse starts at 45 mm or 0.4 tons (360 kg) for embodiment C of FIGS. 9-10 and at 45 mm and 0.3 tons (270 kg) for embodiment B of FIGS. 7-8. Line 130 shows values obtained for a ladle bottom and ladle block of the prior art. Line 132 shows values obtained for a ladle bottom and a ladle block (Embodiment B) of the present invention. Line 134 shows values obtained for a ladle bottom and a ladle block (Embodiment C) of the present invention.

Figure 14:
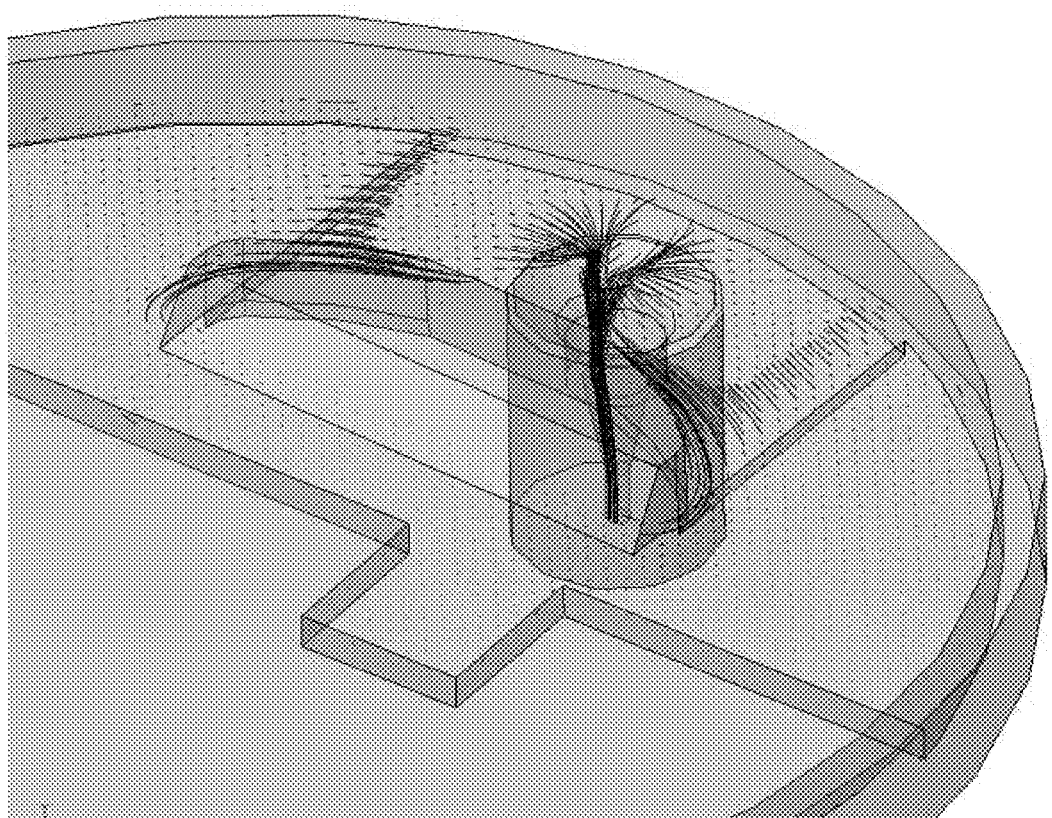
FIG. 14 is a perspective wire frame view of a ladle bottom of the present invention (Embodiment A) showing flow streamlines.

FIG. 14 is a perspective wire frame view of a ladle bottom of the present invention (Embodiment A) showing flow streamlines at a draining rate of 4 T/min (3600 kg/min). The streamlines represent the fluid path in the regions of higher liquid velocity. The streamlines at the entrance of the channel are equally spaced. In use, the streamlines should not detach from the interior surface of the ladle block wall. This is accomplished by keeping the angle between (a) the center of wall interior surface and (b) the end of wall interior surface within the range from 0-40 degrees, 0-30 degrees, 0-25 degrees, 5-20 degrees or 0-20 degrees. In the embodiment shown, the streamlines are following the wall vertical surface; the angle is not large enough to produce streamline detachment along the channel walls leading to vortex formation.

Figure 15:
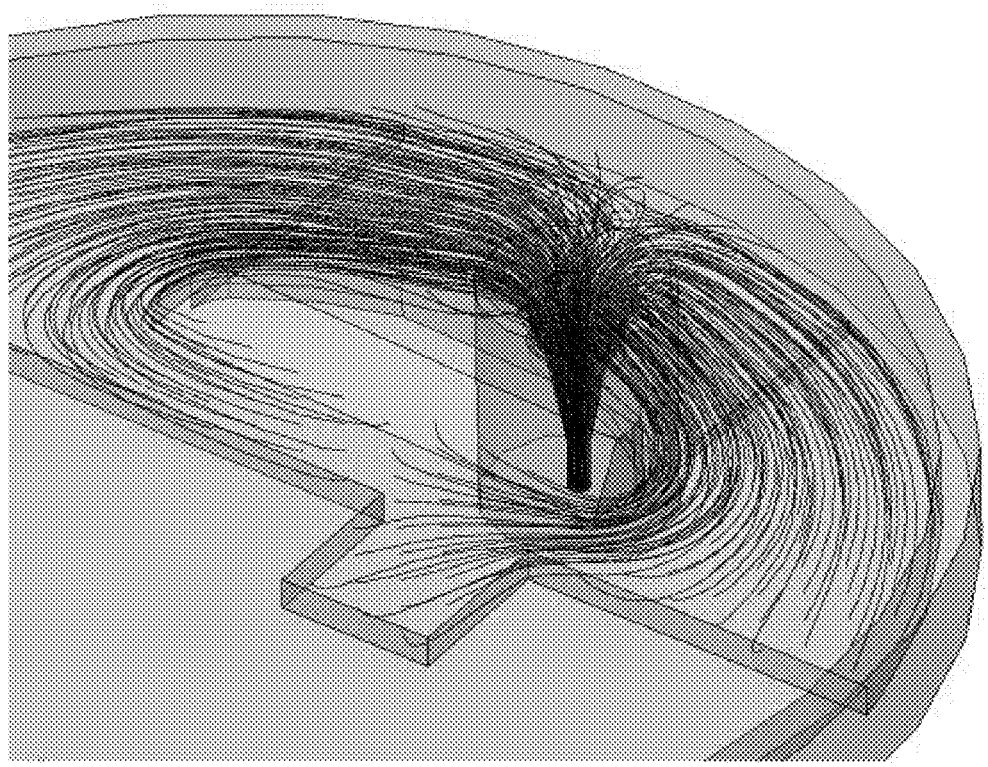
FIG. 15 is a perspective wire frame view of a ladle bottom of the present invention (Embodiment A) showing flow streamlines.

FIG. 15 is a perspective wire frame view of a ladle bottom of the present invention (Embodiment A) showing flow streamlines at a draining rate of 4 T/min (3600 kg/min). The streamlines represent the fluid path in the regions of higher liquid velocity. In FIG. 15, the flow streamlines following the channel wall 26 are not detached from the wall. A larger angle will promote flow detachment leading to vortexing.

Figure 16:
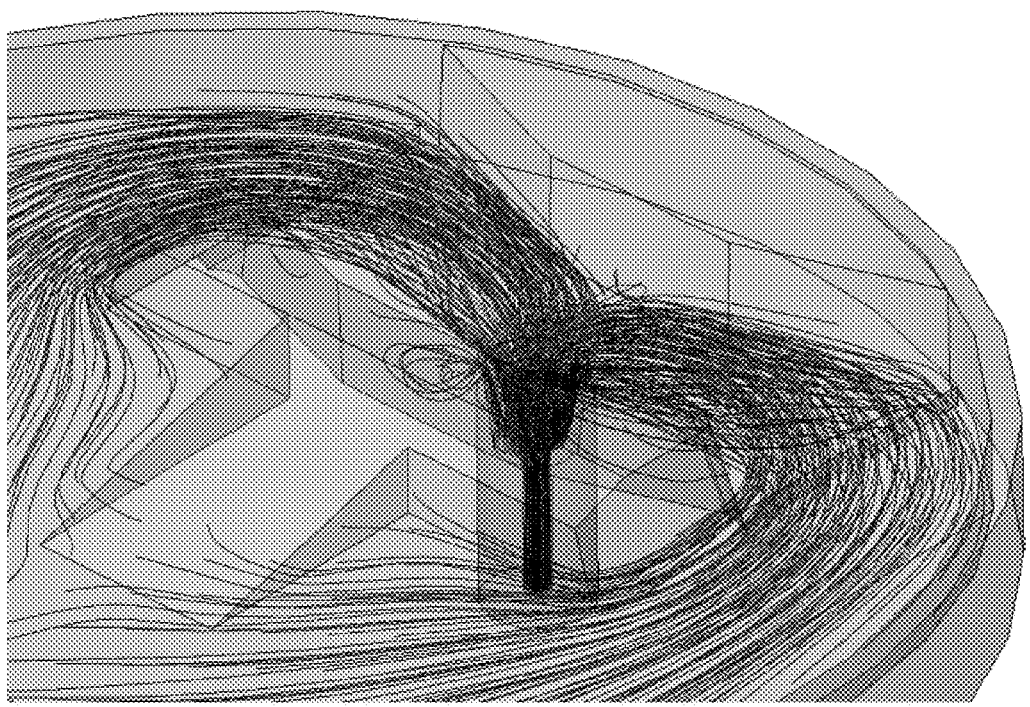
FIG. 16 is a perspective wire frame view of a ladle bottom of the present invention (Embodiment B) showing flow streamlines.

FIG. 16 is a perspective wire frame view of a ladle bottom of the present invention (Embodiment B) showing flow streamlines at a draining rate of 4 T/min (3600 kg/min). The streamlines represent the fluid path in the regions of higher liquid velocity. In use, the streamlines should not detach from the ladle block wall adjacent to the ladle bottom interior radial surface. This is accomplished by keeping the angle between (a) the center of wall interior surface and (b) the end of wall interior surface within the range from 0-40 degrees, 0-30 degrees, 0-25 degrees, 5-20 degrees or 0-20 degrees.

Figure 17:
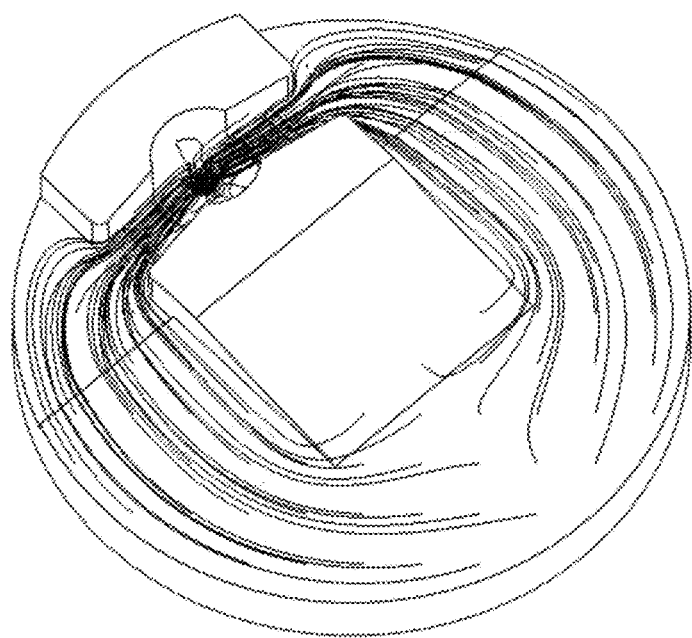
FIG. 17 is a perspective wire frame view of a ladle bottom of the present invention (Embodiment B) showing flow pathlines.

FIG. 17 is a perspective view of a ladle bottom of the present invention (Embodiment B) showing flow pathlines derived for a fluid height of 120 mm.

Figure 18:
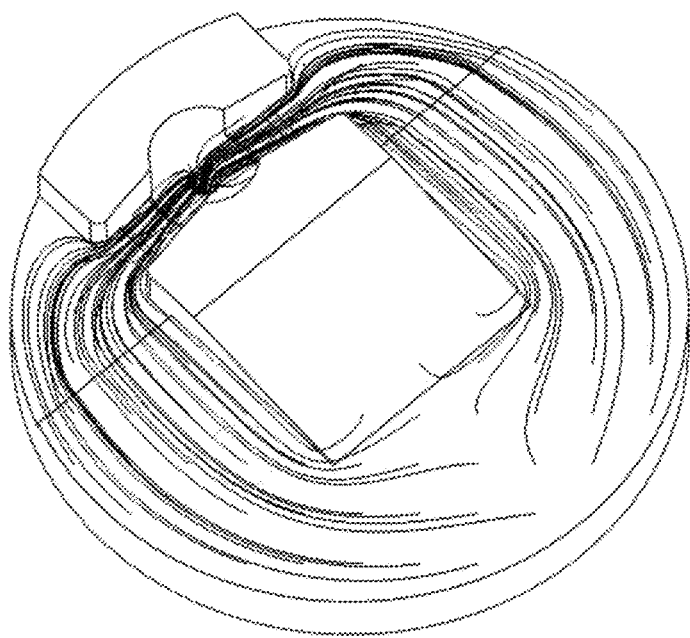
FIG. 18 is a perspective wire frame view of a ladle bottom of the present invention (Embodiment B) showing flow streamlines.

FIG. 18 is a perspective view of a ladle bottom of the present invention (Embodiment B) showing flow pathlines derived for a fluid height of 100 mm.

Figure 19:
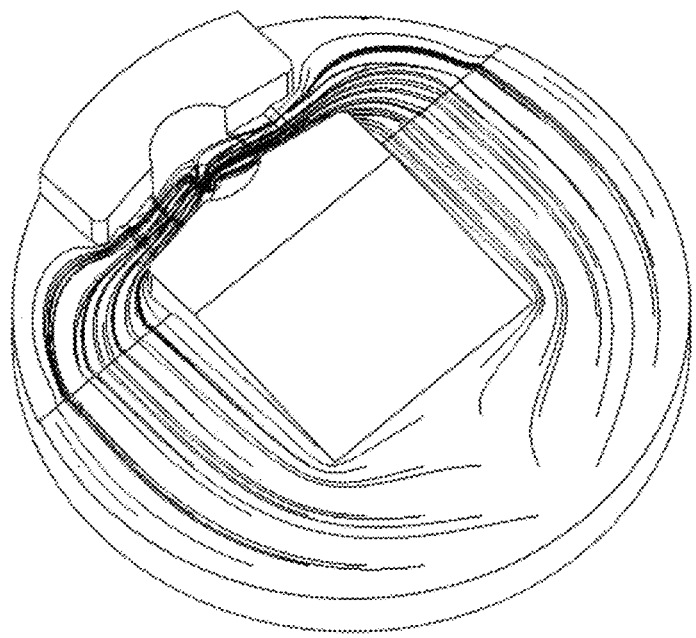
FIG. 19 is a perspective wire frame view of a ladle bottom of the present invention (Embodiment B) showing flow streamlines.

FIG. 19 is a perspective view of a ladle bottom of the present invention (Embodiment B) showing flow pathlines derived for a fluid height of 80 mm.

Figure 20:
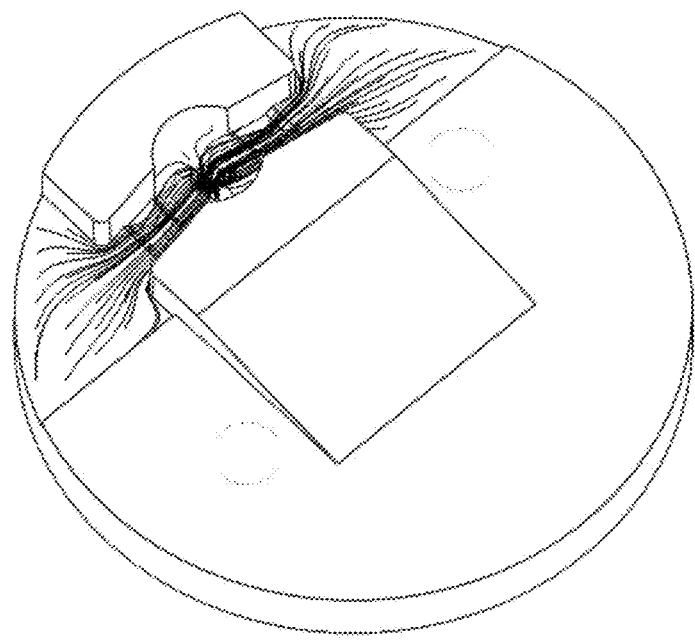
FIG. 20 is a perspective wire frame view of a ladle bottom of the present invention (Embodiment B) showing flow streamlines.

FIG. 20 is a perspective view of a ladle bottom of the present invention (Embodiment B) showing flow pathlines derived for a fluid height of 60 mm.

The refractory block of the invention has been described in respect to its use in a ladle. It may also be used in other vessels for the containment and transfer of molten metal, such as tundishes.

Numerous modifications and variations of the present invention are possible. It is, therefore, to be understood that within the scope of the following claims, the invention may be practiced otherwise than as specifically described.

We claim:

1. A refractory ladle block comprising:
a ladle block body having an upper surface and defining an outlet bore having a center in the plane of the ladle block body upper surface; and
a wall having a major horizontal center line, a height (h) and an interior surface adjacent to the outlet bore, wherein the major horizontal center line has a center point,
wherein the line passing through the center of the outlet bore and the center point of the major horizontal center line is perpendicular to the major horizontal center line;
wherein the main dimension of the outlet bore in the plane of the ladle block body upper surface is D;
wherein the distance from the center of the outlet bore in the plane of the ladle block body upper surface to the wall interior surface is W/2; and
wherein $\frac{1}{2} D \le W$ and
wherein thresholds which protrude upwardly on each end of the ladle block body have a height less than the height (h) of the wall.

2. The refractory ladle block of claim 1, wherein $D \le W$.

3. The refractory ladle block of claim 1, wherein $\frac{1}{2} D \le W \le 3.5 D$.

4. The refractory ladle block of claim 1, wherein
the wall interior surface has a center and an end;
the center of the wall interior surface and the end of the wall interior surface, exclusive of beveling and chamfering, form a channel exit angle; and
the channel exit angle has a value from, and including, 0 degrees to, and including 40 degrees.

5. The refractory ladle block of claim 4 wherein the channel exit angle has a value from, and including, 0 degrees to, and including 30 degrees.

6. The refractory ladle block of claim 4 wherein the channel exit angle has a value from, and including, 0 degrees to, and including 25 degrees.

7. The refractory ladle block of claim 4 wherein the channel exit angle has a value from, and including, 0 degrees to, and including 20 degrees.

8. The refractory ladle block of claim 4 wherein the channel exit angle has a value from, and including, 5 degrees to, and including 20 degrees.

9. The refractory ladle block of claim 1, wherein:
L denotes the straight-line distance from one end of each wall to the other end; and
$D \le L \le 5 D$.

10. The refractory ladle block of claim 1, further comprising a second wall having a major horizontal center line and an interior surface adjacent to the outlet bore, wherein the major horizontal center line has a center point, and wherein the walls are disposed on opposite sides of the outlet bore.

11. The refractory ladle block of claim 10, wherein a first outlet wall has a convex horizontal section facing the outlet bore, and wherein a second outlet wall has a concave horizontal section facing the outlet bore.

12. The refractory ladle block of claim 10, wherein:
opposite ends of each wall are disposed in proximity to opposite ends of the major horizontal center line;
D denotes the diameter of the bore at the ladle block body upper surface;
L denotes the straight-line distance from one end of each wall to the other end; and
$D \le L \le 5 D$.

* * * * *